United States Patent

Delhaye et al.

[11] Patent Number: 5,822,061
[45] Date of Patent: Oct. 13, 1998

[54] SPECTROMETRY APPARATUS

[75] Inventors: Michel Delhaye; Jacques Barbillat, both of Villeneuve D'Ascq; Edouard Da Silva, Lille, all of France

[73] Assignee: Dilor, Lille, France

[21] Appl. No.: 745,244

[22] Filed: Nov. 8, 1996

Related U.S. Application Data

[63] Continuation of Ser. No. 5,999, Jan. 19, 1993, abandoned.

[30] Foreign Application Priority Data

Jan. 20, 1992 [EP] European Pat. Off. ............ 92400141

[51] Int. Cl.⁶ .................................................. G01J 3/28
[52] U.S. Cl. ........................................ 356/326; 356/301
[58] Field of Search .................... 356/301, 346, 356/300, 326, 328, 317, 318, 417, 330–334; 250/461.1, 461.2, 458.1, 459.1, 234

[56] References Cited

U.S. PATENT DOCUMENTS

| | | | |
|---|---|---|---|
| 4,195,930 | 4/1980 | Delhaye et al. | 356/301 |
| 4,284,897 | 8/1981 | Sawamura et al. | |
| 4,407,008 | 9/1983 | Schmidt et al. | 356/301 X |
| 4,732,473 | 3/1988 | Bille et al. | 356/237 |
| 5,091,652 | 2/1992 | Mathies et al. | 250/458.1 |
| 5,192,980 | 3/1993 | Dixon et al. | 356/346 |
| 5,208,648 | 5/1993 | Batchelder et al. | 356/301 |
| 5,329,352 | 7/1994 | Jacobsen | 356/301 |

FOREIGN PATENT DOCUMENTS

| | | |
|---|---|---|
| 0168643 | 1/1986 | European Pat. Off. |
| 0440342 | 8/1991 | European Pat. Off. |
| 2356931 | 1/1978 | France. |
| 2449275 | 9/1980 | France. |
| 3936646 | 8/1990 | Germany. |
| 2184321 | 6/1987 | United Kingdom. |

OTHER PUBLICATIONS

"The Affordable Laser Scanning Confocal Microscope", 1991, Meridan Instruments,clnc.

*Primary Examiner*—K. Hantis
*Attorney, Agent, or Firm*—Dennison, Meserole, Pollack & Scheiner

[57] ABSTRACT

The spectrometry apparatus of the present invention includes, in addition to conventional analysis, a first diaphragm having a first chosen variable aperture for spatially filtering a coherent-excitation beam. The apparatus also includes a first deflector stage (DF1) for sweeping an excitation beam over a sample according to a first chosen deflection. Additionally, there is included a second diaphragm having a second variable aperture conjugate with the first aperture for filtering the incoherent-scattering beam. The spectrometry apparatus further provides a second deflector stage placed downstream in order to sweep the spectral image of the incoherent-scattering beam thus filtered over the multichannel detection module according to a second chosen deflection.

9 Claims, 9 Drawing Sheets

SPECTROMETRY APPARATUS

This is a continuation of application Ser. No. 08/005,999 filed on Jan. 19, 1993, now abandoned.

BACKGROUND OF THE INVENTION

The invention relates to the field of spectrometry.

It finds a general application in instrumental spectrometry and in particular in absorption, emission, scattered-light, transmission, reflection, fluorescence, luminescence and Raman spectrometry, etc.

Spectrometry apparatuses are already known.

Such apparatuses generally comprise:

means for producing coherent-excitation light;

at least a first sample;

a spectrometer having an input aperture;

splitter means capable of splitting the coherent-excitation beam into a first reflected portion RFE greater than 0 and less than 1 and a second transmitted portion TFE with substantially RFE+TFE=1;

first optical coupling means capable of leading the second transmitted portion TFE or the first reflected portion RFE of the coherent-excitation beam onto the first sample, as well as of collecting the incoherent-scattering beam of wavelength different to that of the excitation beam, which results therefrom, the splitter means being capable of splitting said incoherent-scattering beam into a first reflected portion RFD greater than 0 and less than 1 and a second transmitted portion TFD with substantially RFD+TFD=1; and second optical coupling means capable of leading the first reflected portion RFD or the second transmitted portion TFD of the incoherent-scattering beam toward the input aperture of the spectrometer.

The term "spectrometer" is here understood to mean any dispersive analysis instrument of the spectrometer type and its equivalents such as monochromators.

The term "excitational light" is here understood to mean excitational light output by a source such as a laser source, a white-light source, a xenon or mercury source, etc. The adjective "coherent" here distinguishes the excitational light from the incoherent-scattering light which results from the illumination of the sample by said excitational light.

OBJECTS OF THE INVENTION

The Inventor set out to solve the problem of producing a spectrometry apparatus allowing improvement of the incoherent-scattering beam of wavelength different from that of the excitation beam which is received by the input aperture of the spectrometer and which comprises the analysis information.

The invention indeed provides a solution to this problem. The invention starts from a spectrometry apparatus of the aforementioned type.

According to a general definition of the invention, the first optical coupling means comprise focusing means capable of focusing the coherent-excitation beam into a first chosen variable aperture forming a diaphragm for spatially filtering said coherent-excitation beam, and the second optical coupling means comprise second means forming a diaphragm comprising a second variable aperture conjugate with the first aperture for filtering the first reflected portion or the second transmitted portion of the incoherent-scattering beam, which allows an improvement in the spatial resolution of the apparatus.

It is to be observed here that the aforementioned assembly relating to the first and second optical coupling means has the advantage of producing a spectrometry microscope of the confocal type, when the sample is placed beneath the objective of a microscope.

According to a preferred embodiment of the invention, the first optical coupling means furthermore lead the first reflected portion or the second transmitted portion of the coherent-excitation beam onto the first sample, the splitter means being furthermore capable of splitting the incoherent-scattering beam which results from the illumination of said first sample by the first reflected portion or the second transmitted portion of the excitation beam into a first reflected portion and a second transmitted portion and of leading said second transmitted portion or said first reflected portion of said incoherent-scattering beam onto the input aperture of the spectrometer.

According to another preferred embodiment of the invention, the apparatus furthermore comprises a second sample, and the first optical coupling means furthermore lead the first reflected portion or the second transmitted portion of the coherent-excitation beam onto the second sample, the splitter means being furthermore capable of splitting the incoherent-scattering beam which results from the illumination of the second sample by the first reflected portion or the second transmitted portion of the excitation beam into a first reflected portion and a second transmitted portion and of leading said second transmitted portion or said first reflected portion of said incoherent-scattering beam onto the input aperture of the spectrometer.

Such a structure has the advantage of optimizing the use of the reflected and transmitted portions of the excitation beam output by the splitter means and the scattering beams, which results from the illumination of the first sample alone or of the first and second samples by said reflected and transmitted portions of the excitation beam.

Such a structure furthermore makes it possible to compare spectra without any displacement of the first optical coupling means.

In practice, the comparison of the spectrum of the first sample with the spectrum of the second sample is produced with the aid of first means forming a shutter for the first reflected portion of the coherent-excitation beam and with the aid of second means forming a shutter for the second transmitted portion of the coherent-excitation beam.

There are preferably provided a sample holder mounted in horizontal and vertical translations and control means capable of driving the horizontal or vertical translations of said sample holder.

According to an aspect of the invention, the splitter means comprise a splitting plate of the dichroic type, that is to say whose splitting power is a function of the incident wavelength, which allows acquisition of the Stokes lines, the anti-Stokes lines and the low-frequency signal of the Raman signal.

The subject of the present invention is also a spectrometry device with confocal sweeping for spatial analysis of the distribution of chemical species in a sample.

SUMMARY OF THE INVENTION

According to an advantageous characteristic of the device according to the present invention, the device comprises in combination:

means for producing a coherent-excitation light along an output axis;

first means forming a diaphragm comprising a first chosen variable aperture for spatially filtering the coherent-excitation beam;

splitter means capable of splitting the coherent-excitation beam into a first reflected portion and a second transmitted portion;

at least one sample;

a first deflector stage capable of sweeping the second transmitted portion or the first reflected portion of the coherent-excitation beam over the sample according to a first chosen deflection;

first optical coupling means capable of collecting the incoherent-scattering beam of wavelength different to that of the excitation beam which results from the sweeping of the coherent-excitation beam over the sample, splitter means being capable of splitting said incoherent-scattering beam thus collected into a first reflected portion and a second transmitted portion;

second means forming a diaphragm comprising a second variable aperture conjugate with the first aperture to filter the first reflected portion or the second transmitted portion of the incoherent-scattering beam;

a spectrometer possessing an input aperture along an output axis, said spectrometer being equipped with a multichannel detection module comprising a plurality of detector elements and processing means for analyzing the signals picked up by these detector elements;

second optical coupling means capable of leading the first reflected portion or the second transmitted portion of the incoherent-scattering beam toward the input aperture of the spectrometer; and a second deflector stage placed downstream of the second means forming a diaphragm and capable of sweeping the spectral image of the sample over the multichannel detection module according to a second chosen deflection.

Such a structure makes it possible to produce a spectrometry apparatus with confocal sweeping which has the advantage of improving the spatial resolution of the apparatus.

According to one embodiment of the invention, the second deflector stage is disposed upstream of the input aperture of the spectrometer.

According to another preferred embodiment of the invention, in which the spectrometer comprises at least two dispersive stages, the second deflector stage is disposed between said dispersive stages of the spectrometer.

In practice, the first deflection is one-, two- or three-dimensional.

In the same way, the second deflection is one-, two- or three-dimensional.

According to another characteristic of the invention, the first and second deflections may be synchronous and their amplitudes may be automatically linked together so as to produce a chosen magnification of the image of the zone of the sample swept over the multichannel detection module.

According to another aspect of the invention, the device furthermore comprises:

filtering means of the excitation beam, having a predetermined filtering width so as to eliminate a spectral band of predetermined spectral width centered on a frequency corresponding to the wavelength of the excitation beam;

capture means for measuring the light flux deprived of said spectral band thus eliminated; and control means capable of acting on the first deflector stage in order to search for the spectral signal maximum in the light flux thus detected, which allows automatic control of the focusing onto the zone of the sample to be analyzed which is characterized by said spectral signal.

Other characteristics and advantages of the invention will emerge in the light of the following detailed description and of the attached drawings in which.

DETAILED DESCRIPTION OF THE INVENTION

The specific features and advantages of the invention are described with reference to the drawings.

Figure 1:
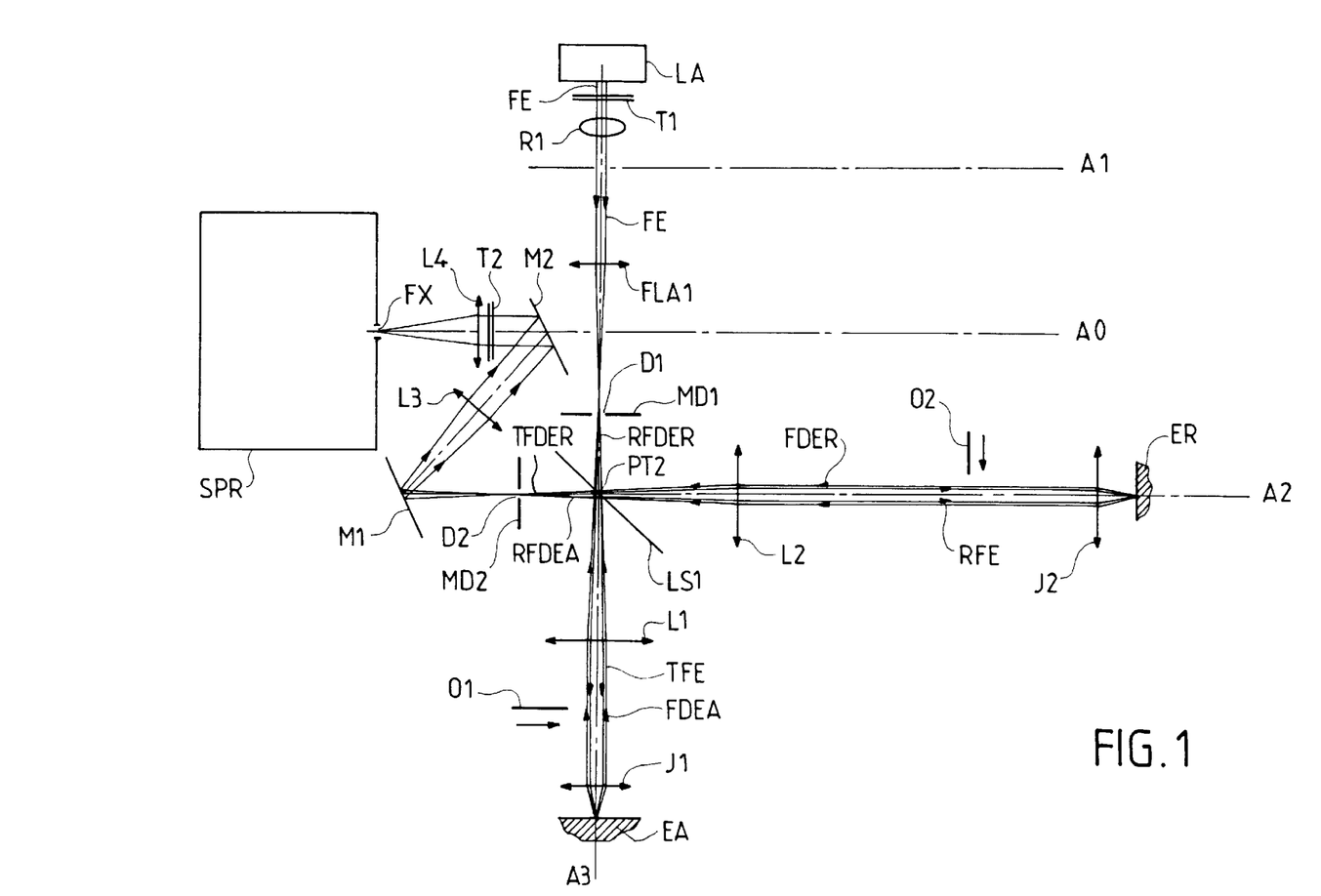
FIG. 1 represents a schematic view of the first and second optical coupling means allowing improvement of the lateral and axial resolution of the apparatus according to the invention, as well as the comparison of the spectra of two separate samples illuminated respectively by the reflected and transmitted portions of the excitation beam.

In FIG. 1, an apparatus according to the invention allowing improvement of the axial and lateral resolutions of a spectrometry apparatus has been represented schematically.

In the rest of the description, reference is made to a Raman spectrometer.

Obviously, the essential and constituent means of the invention which are described here for the Raman case may be applied mutatis mutandis to other spectrometers such as IR, absorption, fluorescence and luminescence spectrometers etc.

This apparatus comprises a light source LA generating a coherent monochromatic excitational light beam along an input axis A3. The monochromatic-light excitation beam FE has a wavelength situated in the visible or near ultraviolet or near infrared spectrum. As a light source, it is possible to use a laser source with continuous-wave operation or alternatively pulsed operation such as an argon laser developing a maximum power of 1 watt for example and emitting a light beam having a wavelength of 488 nm and 514.5 nm.

The coherent-excitation beam FE is first filtered by filters T1 of the absorption or interferential type then polarized by a polarizer member R1 or a polarization rotator.

The filter T1 and the polarizer R1 are disposed along the input axis A3.

The coherent-excitation beam FE is then focused by focusing means FLA1 of the converging type onto an adjustable aperture D1 forming a diaphragm MD1.

The focusing means FLA1 are for example lenses or cylindrical or spherical mirrors. In corollary, the aperture D1 is chosen to be rectangular or circular.

The coherent-excitation beam leaving the diaphragm MD1 is then led onto splitter means LS1 capable of splitting said excitation beam into a first reflected portion RFE greater than 0 and less than 1 and a second transmitted portion TFE with substantially RFE+TFE=1.

An optical coupling member L1 such as a lens will then lead the second transmitted portion TFE of the excitation beam onto the sample EA to be analyzed disposed along the input axis A3.

For example, the sample EA is placed beneath the objective J1 of a microscope.

The optical coupling member L1 will also collect the incoherent-scattering beam which results from the illumination of the sample EA to be analyzed by the second transmitted portion TFE of the coherent-excitation beam.

The splitter means LS1 then split the incoherent-scattering beam FDEA into a first reflected portion RFDEA greater than 0 and less than 1 and a second transmitted portion TFDEA with substantially RFDEA+TFDEA=1.

The first reflected portion RFDEA of the incoherent-scattering beam FDEA is then led toward an adjustable aperture D2 forming a diaphragm MD2 conjugate with the first aperture D1. Thus, in the case of an aperture D1 chosen to be rectangular or circular, the aperture D2 is chosen to be rectangular or circular.

The first reflected portion RFDEA of the incoherent-scattering beam leaving the diaphragm MD2 is finally conveyed by optical coupling members M1, M2, T2 and L4 toward the input aperture FX of the spectrometer SPR arranged along an output axis A0.

The two mirrors M1 and M2 are disposed here to lead the first reflected portion RFDEA of the incoherent-scattering beam leaving the diaphragm MD2 with the axis A2 parallel to the output axis A0 toward said output axis A0. Obviously, the mirrors M1 and M2 are not necessary in the case where the splitter means LS1 act along the output axis A0.

The filter T2 and the collimation lens L4 arranged along the output axis A0 allow focusing of the first reflected portion RFDEA of the incoherent-scattering beam leaving the mirror M2 into the input aperture FX of the spectrometer SPR.

According to the invention, the focusing of the coherent-excitation beam FE into the adjustable aperture D1 of the diaphragm MD1 allows said coherent-excitation beam to be spatially filtered on the one hand, and the focusing of the image of the sample in incoherent scattered light onto a diaphragm MD2 whose aperture D2 is adjustable and conjugate with the aperture D1, that is to say of the sample to be analyzed, allows the axial and lateral resolution of the apparatus to be improved on the other hand.

It is to be observed that the means forming the diaphragm MD1 are separated from the splitter means LS1 by a distance which is different from that separating the second means forming the diaphragm MD2 from the splitter means LS1. This difference in distance is due to the fact that the excitation beam filtered by the diaphragm MD1 is a coherent-light beam while the scattering beam filtered by the diaphragm MD2 is an incoherent-light beam.

Furthermore, it should be observed that the incoherent-scattering beam is observed at a wavelength which is different from that of the excitation beam.

According to the invention, the conjugate use of the means forming diaphragm MD1 and MD2 and of the focusing means of the excitation beam FLA1 when the sample is placed beneath the objective of a microscope thus surprisingly makes it possible to produce a confocal Raman spectrometry microscope.

The essential advantage of such a confocal Raman microscope, by moving the sample horizontally or vertically, is to allow analyses of the tomographic type, that is to say in several layers.

It is to be observed that the splitting of the excitation and scattering beam into two portions being symmetrical, it results that what applies to the first reflected portion of the beam may apply mutatis mutandis to the second transmitted portion of the beam and vice versa.

Thus, the configuration described with reference to FIG. 1 is only a practical embodiment example. Obviously, the conjugate use of the means forming diaphragm MD1 and MD2 and of the focusing means of the excitation beam FLA1 also applies to the configuration in which the reflected portion of the excitation beam illuminates the first sample and in which the transmitted portion of the resulting scattering beam is conveyed toward the input aperture of the spectrometer.

According to another embodiment of the invention, provision is made for disposing a second sample ER along the second axis A2 parallel to the output axis A0.

It should be observed that the input axis A3 and the second axis A2 intersect at a given point PT2 belonging to the splitter means LS1, here the two axes A3 and A1 are perpendicular at this point PT2.

The Inventor also set out to optimize the use of the reflected RFE and transmitted TFE portions of the coherent-excitation beam FE split by the splitter means LS1.

According to the invention, a coupling member L2 of focusing lens type is provided in order to lead the first reflected portion RFE of the excitation beam onto the second sample ER along the output axis A0.

The splitter means LS1 furthermore split the scattering beam FDER which results from the illumination of the second sample ER by the first reflected portion RFE of the excitation beam into a first reflected portion RFDER and a second transmitted portion TFDER. The second transmitted portion TFDER is then led toward the aperture FX of the spectrometer SPR.

The second sample ER is either disposed beneath the objective of a microscope, in which case the term used is a Raman microanalysis instrument, or is placed on a conventional sample holder, in which case the term used is a Raman macroanalysis instrument.

By intercalating means forming a shutter O2 on the first reflected portion RFE of the excitation beam illuminating the second sample ER and means forming a shutter O1 on the second transmitted portion TFE of the excitation beam illuminating the first sample EA, it is possible to make comparisons of the two Raman spectra without moving the optical coupling means.

For example, it is possible to make subtraction, addition or ratio measurements between the two resulting Raman spectra.

It should be observed that these measurements advantageously benefit from the improvement brought to the axial and lateral resolution according to the invention, with respect to the two samples.

Figure 2:
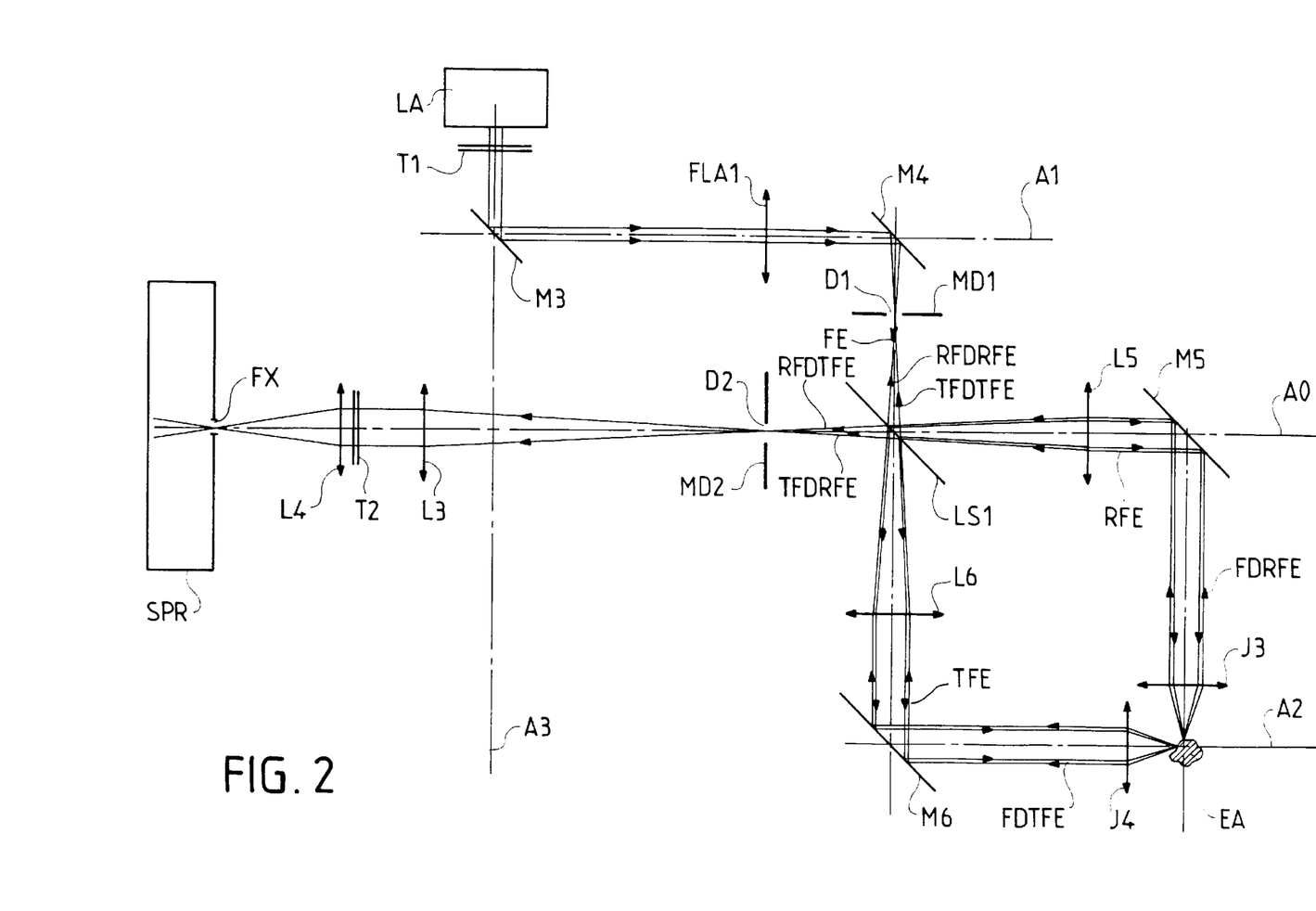
FIG. 2 is a schematic view of the first optical coupling means allowing illumination, furthermore, of the sample to be analyzed by the reflected and transmitted portions of the coherent-excitation beam according to the invention.

Reference is now made to FIG. 2.

The Inventor has surprisingly noted that optimum use of the excitation beam split by the splitter means LS1 to illuminate two separate samples may also be applied advantageously to a single sample.

The sample EA to be analyzed is disposed here along the axis A2.

Optical coupling members comprising two mirrors M3 and M4 here lead the coherent-excitation beam FE from the input axis A3 toward the output axis A0 via the first axis A1 parallel to the output axis A0.

The splitter means LS1 are arranged here along the output axis A0.

The first reflected portion RFE of the coherent-excitation beam FE is led onto the sample EA to be analyzed by a focusing lens L5 and a mirror M5.

For example, the sample EA to be analyzed is placed beneath the objective J3 of a Raman microscope.

For its part, the second transmitted portion TFE of the excitation beam is conveyed onto the sample EA to be analyzed with the aid of a mirror M6, of a lens L6 and of an objective J4.

The splitter means LS1 split on the one hand the incoherent-scattering beam FDRFE which results from the illumination of the sample EA by the first reflected portion RFE into a first reflected portion RFDRFE and a second transmitted portion TFDRFE. In the configuration described with reference to FIG. 2, it is the second portion TFDRFE which is then conveyed toward the input aperture FX of the spectrometer SPR.

The splitter means LS1 split on the other hand the scattering beam FDTFE resulting from the illumination of the same sample EA by the second transmitted portion TFE of the excitation beam into a first reflected portion RFDTFE and a second transmitted portion TFDTFE. In the configuration described with reference to FIG. 2, it is the first reflected portion RFDTFE which is then conveyed toward the input aperture FX of the spectrometer SPR.

A person skilled in the art will understand that such a configuration allows the sample to be analyzed to be simultaneously illuminated along two orientations and to collect together the two scattering beams resulting from this double illumination.

The result is a gain in the light flux which will be led into the input aperture of the spectrometer. This gain is substantially twofold with respect to the conventional single illumination.

This configuration also provides an advantage when samples are being analyzed whose positioning is not critical, for example in an industrialization phase.

It is to be noted that the double illumination of the sample and the double collecting together of the scattering beams which results therefrom advantageously benefits from the improvement brought to the axial and lateral resolution according to the invention as described with reference to FIG. 1.

It is also to be noted that it is possible to interpose means forming a shutter on the path of the first and second portions of the excitation beam in order to perform compared measurements of the Raman spectrum.

It should be observed that when the splitting plate LS1 is removed, the coherent-excitation beam FE is reflected by the mirror M6 and then illuminates the sample EA to be analyzed, the incoherent-scattering beam which results therefrom is then reflected by the mirror M5 in order to be led toward the input aperture FX of the spectrometer SPR.

It is to be observed that this reduces to a limiting case when the reflected excitation beam is zero while the transmitted excitation beam is a maximum.

On the other hand, when replacing the splitting plate by a mirror, the opposite is true, that is to say that the reflected excitation beam is a maximum while the transmitted excitation beam is zero.

Advantageously, the splitter means LS1 may consist of a semi-transparent splitting plate of the dichroic type, that is to say a plate whose splitting power is a function of the wavelength of the incident beam.

The use of a dichroic splitting plate has the advantage over the conventional assembly of acquiring the Stokes and anti-Stokes lines and the low-frequency spectrum of the Raman signal.

In fact, conventionally, the response curve of the dichroic splitting plate is generally chosen such that the transmitted portion of the coherent-excitation beam is very high with respect to the reflected portion of said excitation beam or vice versa. The result is that the beam received by the aperture of the spectrometer which defines the Raman signal only contains the Stokes line or the anti-Stokes line and does not contain the intermediate zone called the low-frequency signal by a person skilled in the art.

Conversely, by virtue of the invention, because of the double illumination of the sample and of the double collection of the scattering beams which result therefrom, it is possible to acquire the Stokes and anti-Stokes lines and the low-frequency spectrum of the Raman signal.

It is also to be noted here that the double illumination of the sample and the double collection of the scattering beams which results therefrom advantageously benefits from the improvement brought to the axial and lateral resolution according to the invention as described with reference to FIG. 1.

Figure 3:
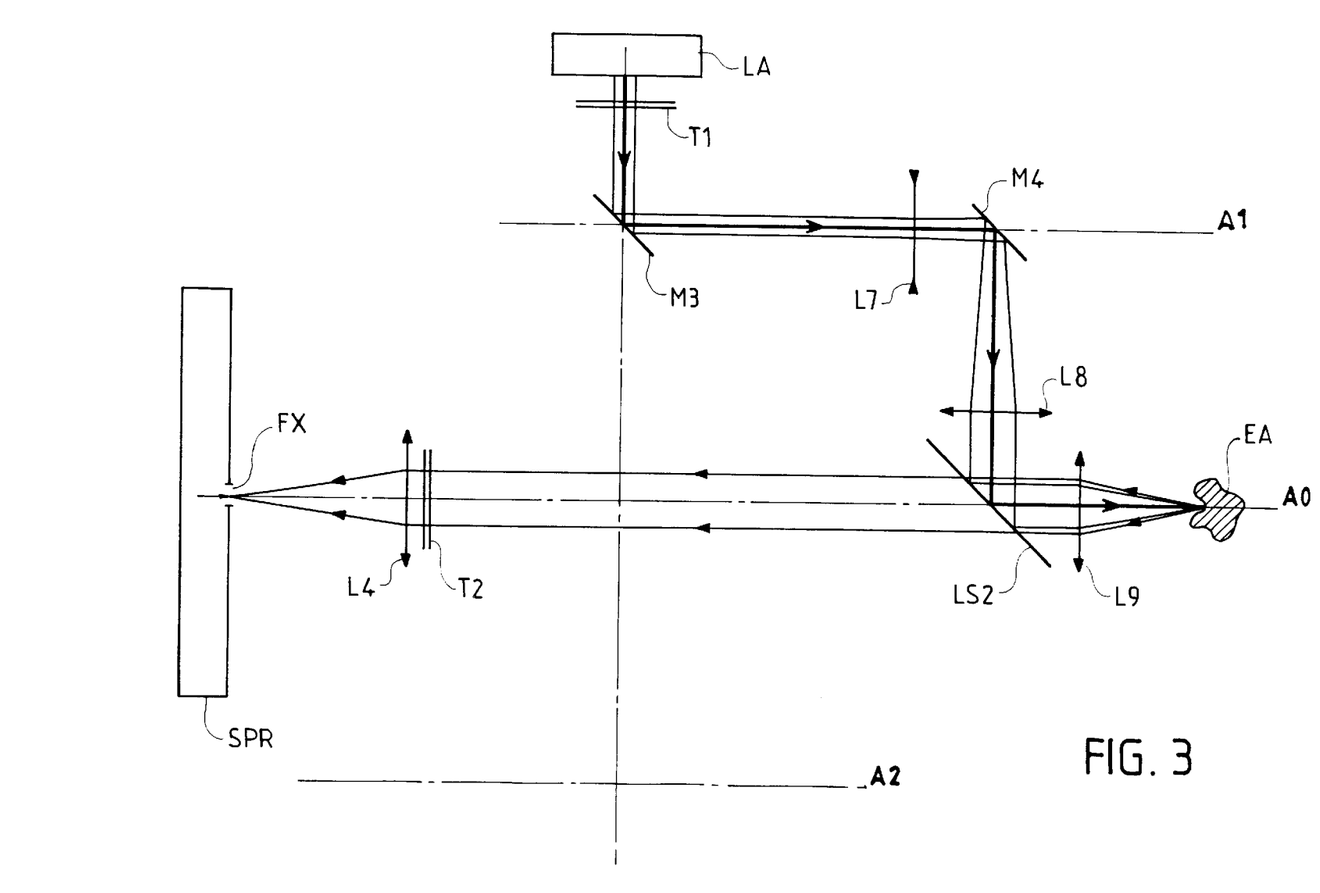
FIG. 3 is a schematic view of the excitation-beam expanders according to the invention.

Reference is now made to FIG. 3.

This case deals with means forming an expander of the excitation beam FE which are mounted upstream of the splitter means LS2.

In practice, the expander means form a so-called Galilean telescope consisting of a diverging lens L7 and a converging lens L8.

The two lenses L7 and L8 are here disposed around a mirror M4 leading the excitation beam FE toward the splitter means LS2.

Figure 4:
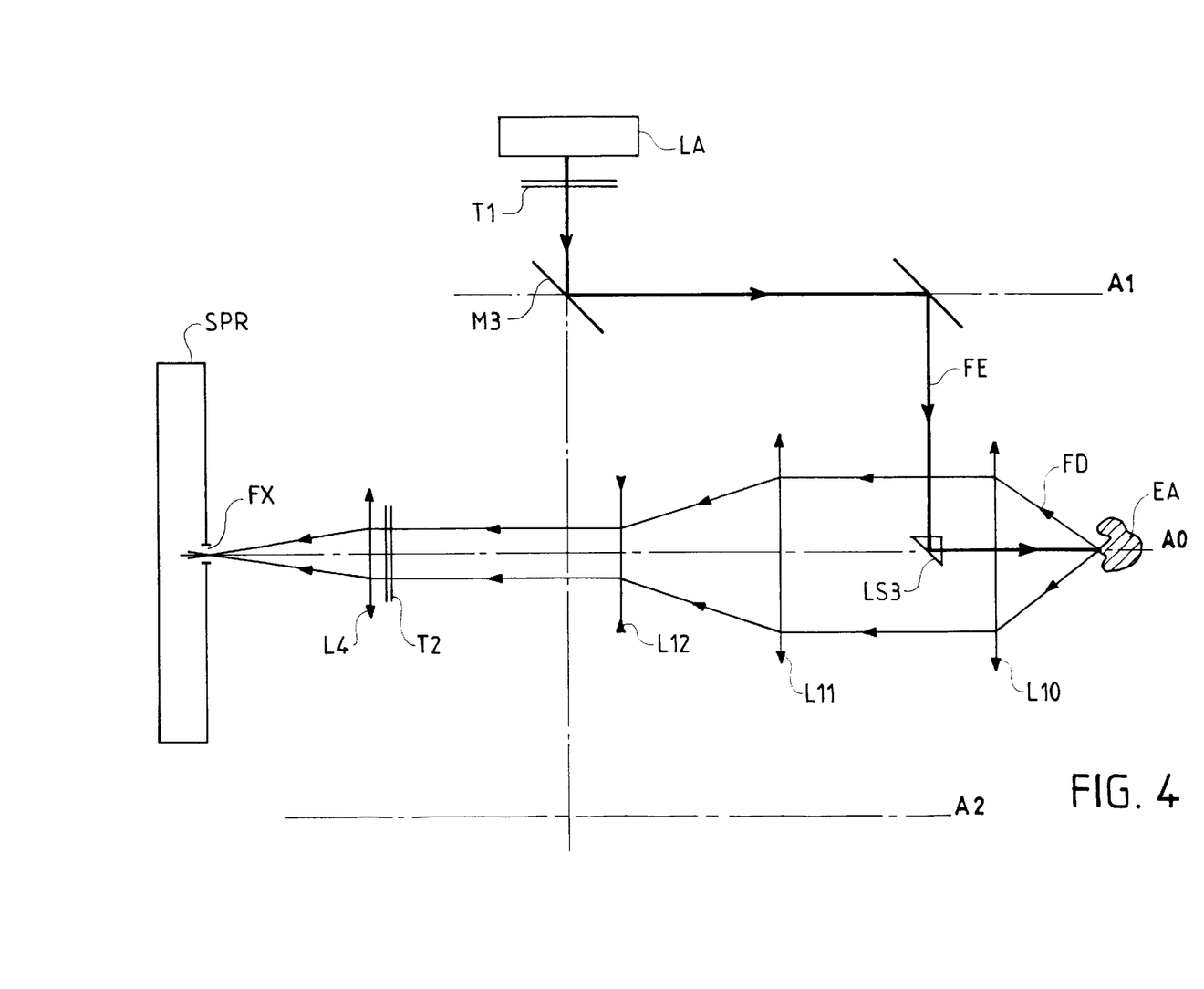
FIG. 4 is a schematic view of the aperture adapters of the scattering beam according to the invention.

Reference is now made to FIG. 4.

This case deals with means forming an aperture adapter of the scattering beam FD which are mounted downstream of the splitter means LS3. For example, the splitter means are of the splitter prism type.

In practice, the adapter means form a so-called Galilean telescope consisting of a focusing lens L10, a converging lens L11, and a diverging lens L12.

It is also to be noted here that the expansion of the excitation beam and the aperture adaption of the scattering beam advantageously benefit from the improvement brought to the axial and lateral resolution according to the invention as described with reference to FIG. 1.

Figure 5:
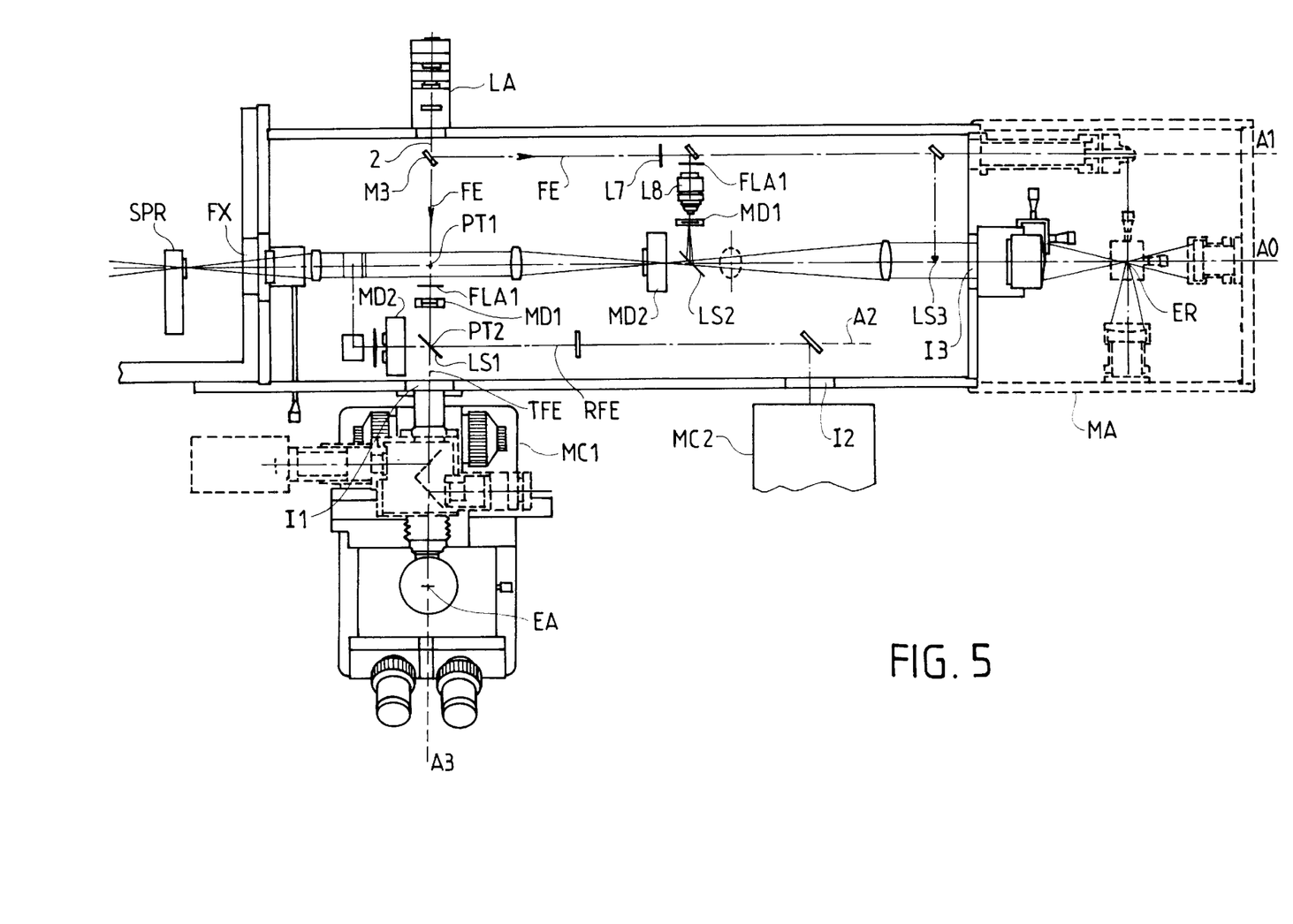
FIG. 5 is a stage unit supporting the first and second optical coupling means according to the invention.

Reference is now made to FIG. 5.

This case deals with a stage unit according to the invention, intended to receive the optical coupling means allowing the operation of a Raman spectrometry apparatus according to the invention to be improved.

The essential and constituent elements of a Raman spectrometry apparatus are again found, namely a laser source LA for producing a coherent-excitation light along the input axis A3; at least one sample to be analyzed, (in FIG. 5, there are represented on the one hand a first sample EA to be analyzed disposed beneath the objective of a microscope MC1, and on the other hand a second sample ER disposed on a sample holder forming a macroanalysis instrument MA).

According to the invention, the means allowing the axial and lateral resolutions of the apparatus to be improved are expediently disposed around the splitter means LS1 disposed at the intersection of the input axis A3 and the second axis A2 at the point PT2.

The Inventor also set out to solve the problem of making the various optical coupling elements modular in order to allow easy and reproducible interchange of said elements.

For this purpose, it was necessary to prevent the excitation beam and the scattering beam which results therefrom simultaneously passing through the point PT1 forming the intersection between the input axis A3 and the output axis A0.

On the basis of this observation, the Applicant disposed the optical coupling elements expediently.

For example, the interchangeable mirror M3 makes it possible to make the excitation beam act along the first axis A1 parallel to the output axis A0.

There are provided a first input J1 for a first microscope MC1, a second input I2 for a second microscope MC2, as required, and a third input I3 for a macro-analysis instrument MA.

The sample EA may thus be analyzed by the second portion TFE of the second excitation beam PE transmitted by the splitter means LS1 while the first reflected portion RFE of the excitation beam FE may illuminate another sample via the input I2 as described with reference to FIG. 1, or the same sample as described with reference to FIG. 2.

According to another aspect of the invention, provision is made to interpose upstream of the splitter means LS2, means forming an expander of the excitation beam FE as described with reference to FIG. 3.

According to another embodiment of the invention, provision is made to interpose on the output axis A0, a splitter prism LS3 capable of splitting the excitation beam into a first reflected excitation portion capable of illuminating the sample ER and to interpose, still on the output axis A0, means forming an aperture adapter of the scattering beam, as described with reference to FIG. 4.

It should be observed that means forming diaphragm MD1 and MD2 allowing improvement in the axial and lateral resolutions of the apparatus may be disposed around splitter means LS2 and LS3 according to the invention.

Figure 6:
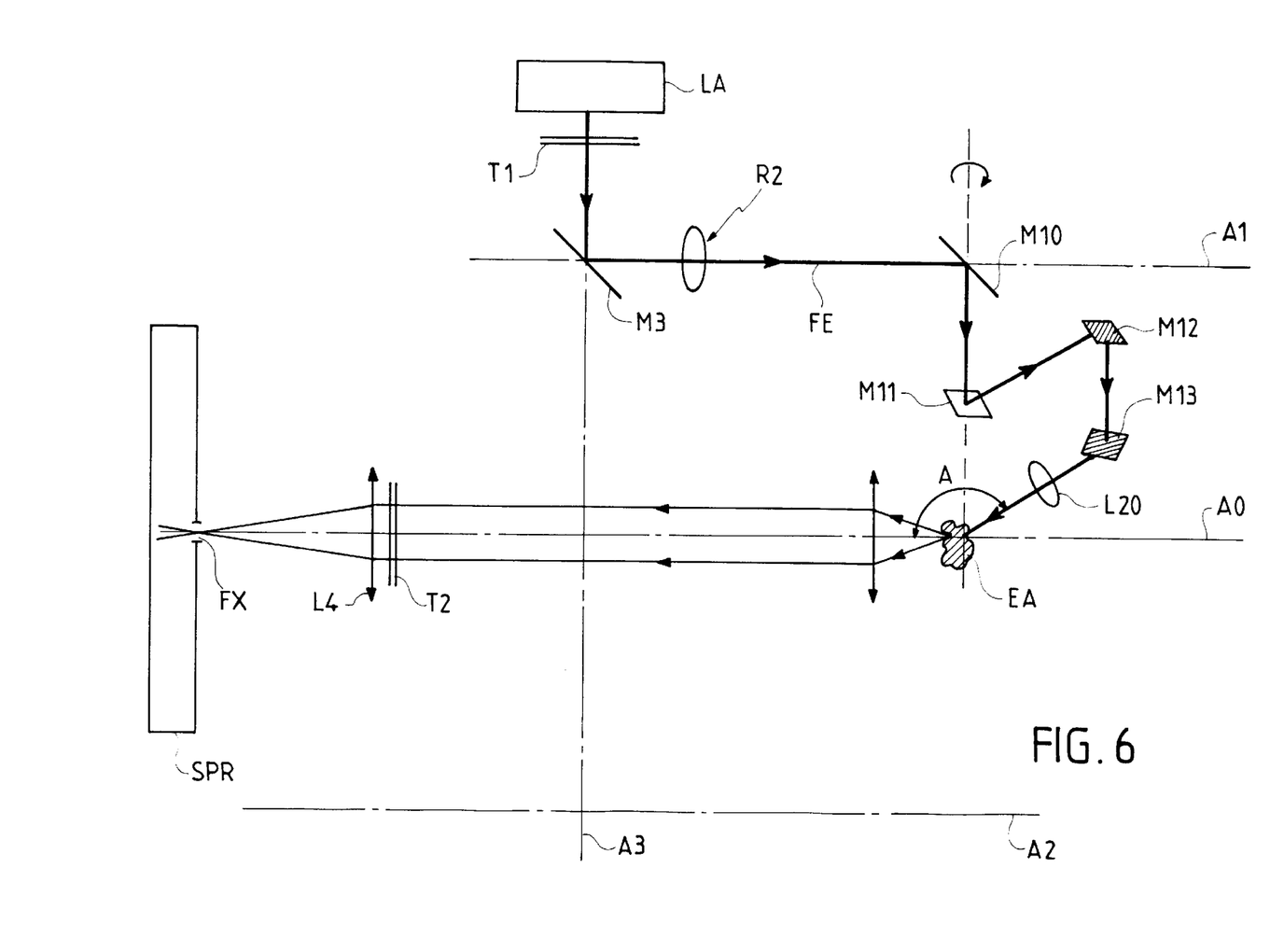
FIG. 6 is a schematic view of the means forming an optical crank according to the invention.

Reference is now made to FIG. 6 which represents an optical crank.

This optical crank is advantageously fitted onto the stage unit as described with reference to FIG. 5 at the region of the second input I2.

More precisely, the optical crank comprises a set of mirrors M11, M12 and M13 rotating with respect to an axis parallel to the input axis A3.

For example, the coherent-excitation beam is first reflected by a mirror M3 disposed along the first axis A1. Polarizer means R2 polarize the excitation beam FE. The excitation beam thus polarized is then led via a mirror M10 onto the rotating mirror M11 which then reflects, with a variable angle, the excitation beam FE onto a mirror M12 and M13 mechanism solidly attached to the mirror M11. A focusing lens L20 is interposed between the rotating mirror M11 and the sample EA to be analyzed.

A person skilled in the art will understand that with such an optical crank, it will be possible to analyze the sample in several orientations.

For ease of clarity of the disclosure of the invention, the dispositions of the various optical elements with respect to each other, described with reference to FIGS. 1 to 6, are chosen with right angles. Obviously, the invention applies to other dispositions of the various optical elements with different angles.

In another embodiment of the invention, to which the abovementioned variants are applicable, it is sought to benefit from the advantages imparted by sweeping devices while retaining the advantages imparted by the confocal device described hereinabove.

Figure 7:
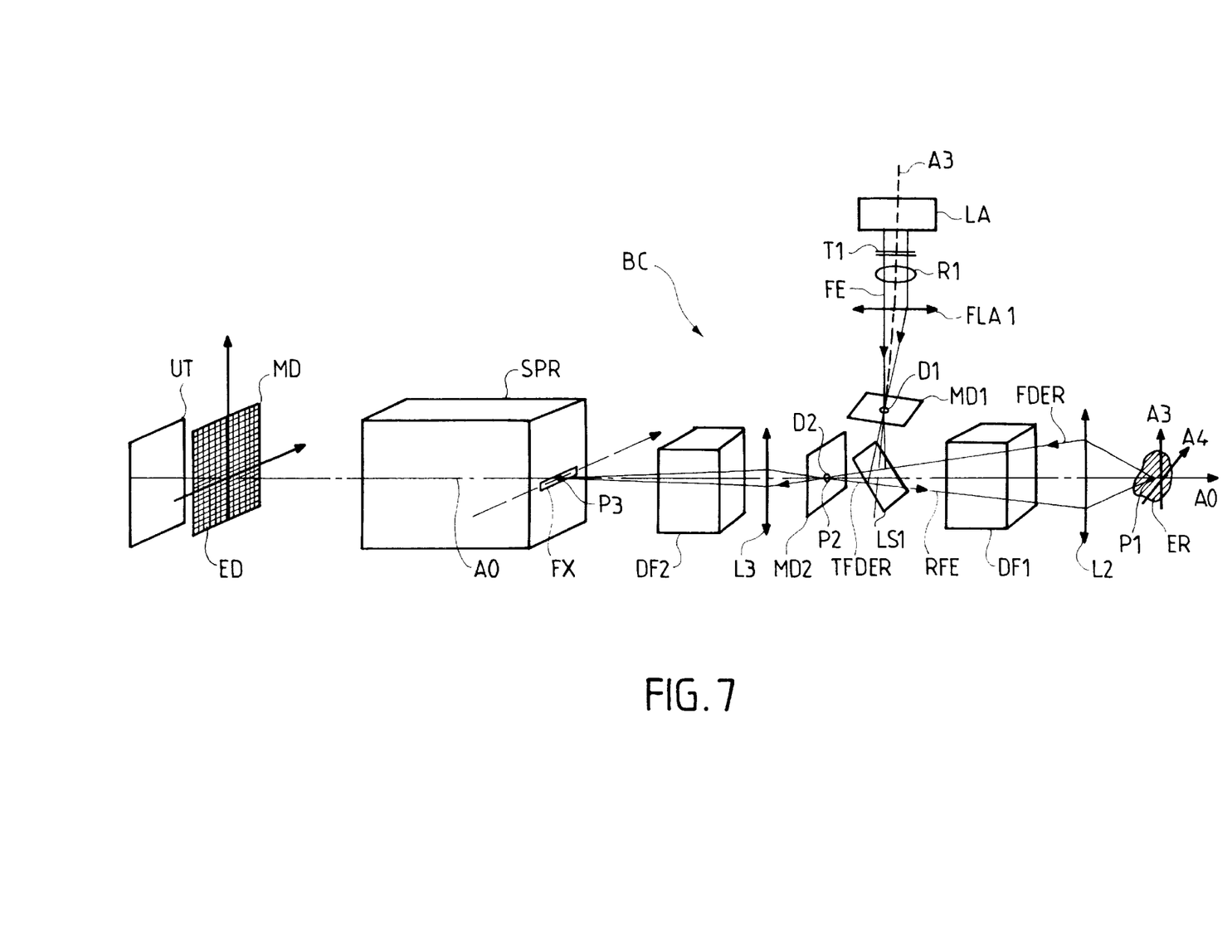
FIG. 7 is a schematic view of the spectrometry apparatus with confocal sweeping according to the invention.

The block diagram in FIG. 7 gives the general characteristics of a Raman spectrometry apparatus with confocal sweeping.

In comparison to FIG. 1, it is observed that the Raman spectrometry apparatus with confocal sweeping, designated by reference BC, furthermore comprises two deflector stages DF1 and DF2.

According to the invention, the first deflector stage DF1 is disposed downstream of the splitter means LS in order to allow sweeping of the first reflected portion RFE of the coherent-excitation beam over the sample ER according to a first chosen deflection X1.

Very advantageously, the zone P1 of the sample illuminated by the first reflected portion RFE of the coherent-excitation beam FE and the optical image P2 of this zone P1 in the aperture D2 of the diaphragm MD2 are maintained optically conjugate.

The deflection X1 may be one-dimensional with respect to the axis A3, two-dimensional with respect to the axes A3 and A0 and three-dimensional with respect to the axes A3, A0 and A4 which is an axis perpendicular to A3 and A0.

A one-dimensional deflection X1 corresponds to scanning along a chosen line of the sample.

A two-dimensional deflection along the axes A3 and A4 corresponds to scanning along a chosen curve or a chosen surface of the sample.

A three-dimensional deflection corresponds to successive scanning of several optical sections, that is to say depth scanning. Such scanning has numerous advantages as will be seen further on, in particular in analysis of the mapping or tomographic type.

The installation represented in FIG. 7 is completed by a multichannel detection module MD comprising a plurality of detector elements ED, receiving the spectral image emitted by the dispersive spectrometer SFR.

Finally, processing means UT are coupled to the multichannel detection module in order to analyze the signals picked up by these detector elements EL.

For example, the detection module MD is of the matrix type and the detector elements are of the CCD type, that is to say using charge transfer.

According to the invention, the second deflector stage DF2 is placed downstream of the second means forming a diaphragm MD2 in order to sweep, according to a second chosen deflection X2, the spectral image of the incoherent-scattering beam thus filtered by the second means forming a diaphragm MD2 on the multichannel deflection module MD.

In the example represented in FIG. 7, the second deflector stage is placed upstream of the input slit FX of the dispersive spectrometer SFR. It is to be observed that the dispersive spectrometer is of the type called stigmatic, that is to say that it gives, for each point of the slit FX, a spectral image covering a line of pixels of the matrix detector MD.

In FIG. 7, a rectilinear input slit FX is represented.

In this case, the deflection X2 is chosen to be one-dimensional (transverse displacement) so that the optical image P3 of the image P2 moves transversely over the rectilinear input slit FX.

As a variant, it is possible to envisage the case of curved slits FX, of systems with several slits or of a spectrometer of the HADAMARD or similar type, which may lead to the choice of a two-dimensional deflection X2.

It is to be observed that the deflections X1 and X2 are produced so as to retain a confocal configuration in which the image P2 of the analyzed zone P1 of the sample is formed on an adjustable diaphragm D2, which ensures spatial filtering and provides advantages relating to the illumination of stray light and the improvement in the lateral and axial resolution which was mentioned hereinabove.

As will be seen below in more detail, the second deflector stage DF2 may be placed, in a variant, between the two dispersive stages of the spectrometer SPR, or alternatively at the output of the monochromators of the dispersive spectrometer.

In another embodiment of the invention, to which the abovementioned variants are applicable, it is sought to produce a stage unit with confocal sweeping.

Figure 8:
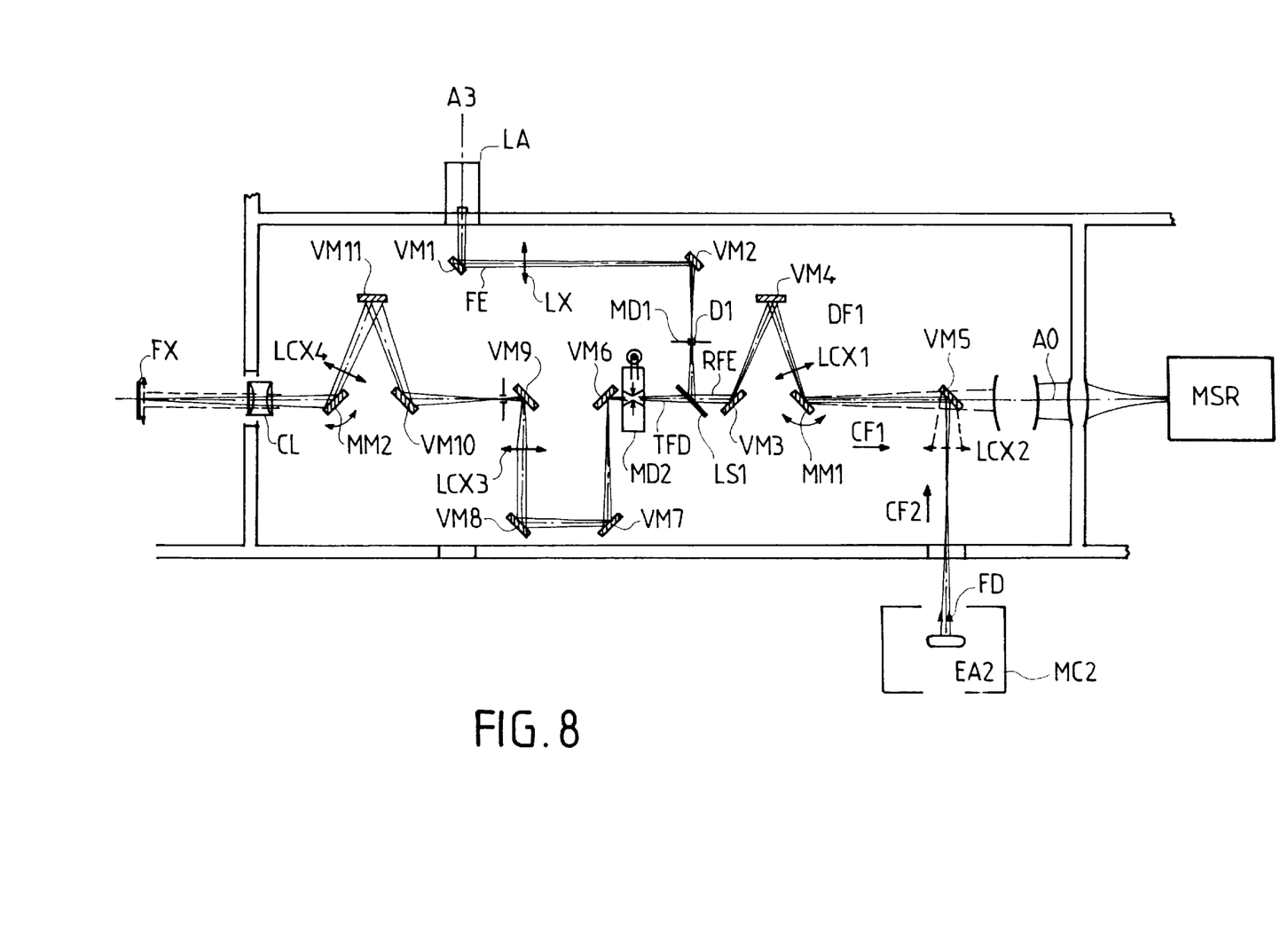
FIG. 8 is an embodiment of the first and second deflector stages according to the invention.

The block diagram in FIG. 8 gives the general characteristics of this stage unit with confocal sweeping.

In comparison with FIG. 5, it is observed that the apparatus now comprises not only means forming diaphragm MD1 and MD2, but also the deflector stages DF1 and DF2.

The essential and constituent elements of the Raman spectrometry apparatus are again found, namely a laser source LA for producing coherent-excitation light along the input axis A3, at least one sample EA2 to be analyzed disposed beneath the objective of a microscope MC2 or beneath the objective of an optical apparatus of longer focal length such as a Raman macroanalysis instrument MSR.

Optical coupling members comprising two mirrors VM1 and VM2 here lead the coherent-excitation beam FE from the input axis A3 toward the output axis A0.

The splitter means LS1 are here arranged along the output axis A0.

A lens LX is interposed between the mirrors VM1 and VM2 in order to focus the beam FE onto the diaphragm MD1.

The adjustable diaphragm MD1 is intercalated between the mirror VM2 and the splitter means LS1, in order spatially to filter the coherent-excitation beam FE.

According to the invention, the deflector stage DF1 disposed downstream of the splitter means LS1, comprises a mirror MM1 which can be moved in rotation.

The mirror MM1 which can be moved in rotation sweeps, in the forward direction of the light path (arrow CF1, FIG. 8), the reflected portion of the coherent-excitation beam RFE over the sample to be analyzed (placed beneath microscope MC2 or beneath macroanalysis instrument MSR).

By virtue of the invention, the reflected portion of the coherent-excitation beam illuminates the sample according to a chosen and variable deflection X1, which makes it possible to illuminate any zone of the said sample.

The stationary mirrors VM3, VM4 and VM5 complete the surroundings of the deflector stage DF1.

Furthermore, focusing LCX1 or field LCX2 lenses may be disposed on the optical path of the excitation beam RFE.

In the backward direction of the light path (arrow CF2, FIG. 8) the scattering beam FD resulting from the illumination of the sample to be analyzed by the reflected portion of the excitation beam RFE is collected by splitter means LS1 after deflection by the deflector stage DF1.

It should be observed here that the deflector stage DF1 ensures simultaneous deflection of the exciting beam and of the scattering beam which comprises the analysis information. These two beams which are of different types and directions of propagation here follow the same light paths.

For their part, the splitter means LS2 split the scattering beam F2 into a reflected portion and a transmitted portion.

Here, it is the transmitted portion TFD which is conveyed toward a diaphragm MD2 having an adjustable aperture D2.

According to the invention, a deflector stage DF2 is placed downstream of the diaphragm D2.

For example, the deflector stage DF2 comprises a mirror MM2 which can be moved in rotation in order to sweep the spectral image of the sample over the input slit FX of the dispersive spectrometer SPR.

The mirror MM2 which can be moved in rotation allows sweeping of the spectral image output from the diaphragm MD2 over the slit FX according to a chosen and variable deflection X2.

The surroundings of the deflector stage DF2 are completed by a plurality of stationary mirrors VM6, VM7, VM8, VM9, VM10, VM11 making it possible to convey the light beam from the diaphragm MD2 onto the mirror MM2 which can be moved in rotation.

Focusing lenses LCX3 and LCX4 also supplement the architecture.

At the output from the mirror MM2, means CL for correcting astigmatism are furthermore provided.

A person skilled in the art will understand that the confocal stage unit with sweeping described with reference to FIG. 8 has the advantage of being able to be used equally well in Raman spectrometry, in fluorescence spectrometry, in luminescence spectrometry, etc.

In fact, the essential and constituent elements of the confocal stage unit with sweeping are not influenced here by the spectrometry technique used since they may be used in any spectrometry technique.

Figure 9:
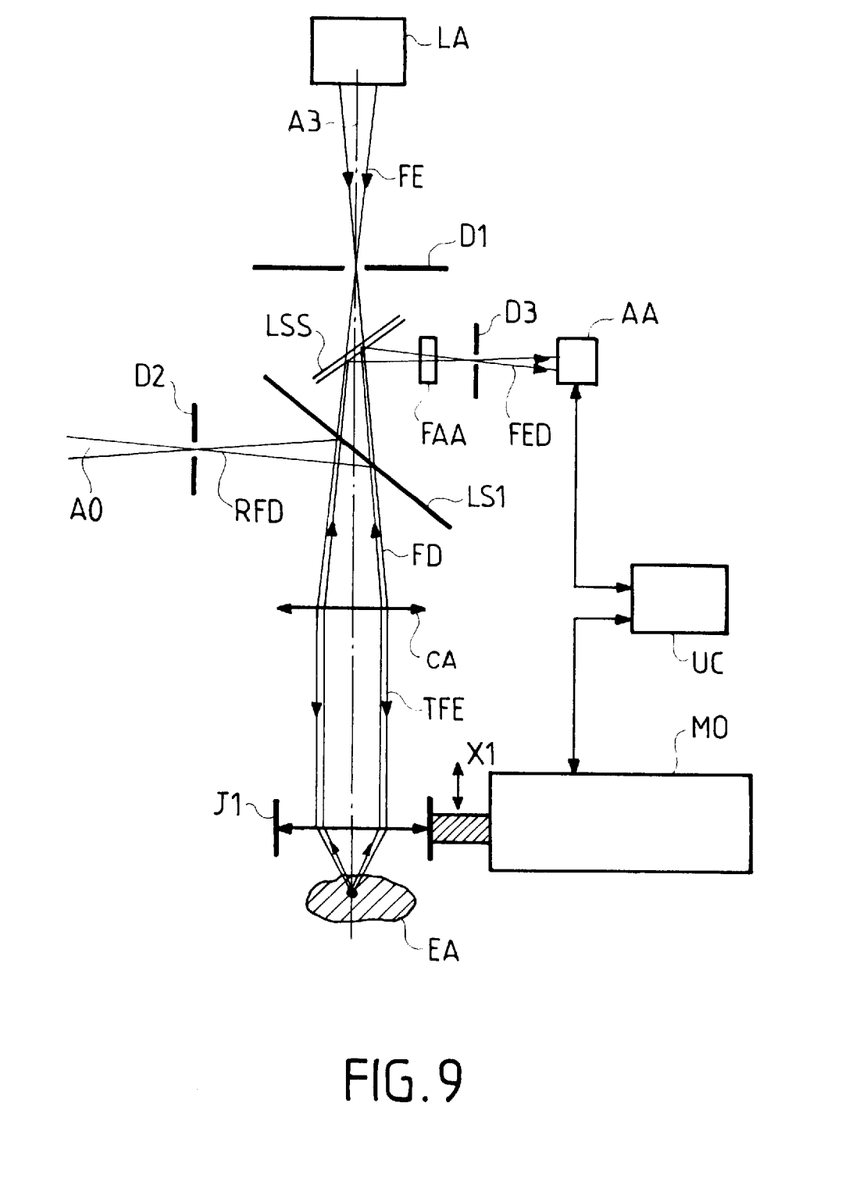
FIG. 9 is a schematic view of the autofocus device according to the invention.

With reference to FIG. 9, the essential and constituent means of the Raman spectrometry apparatus with confocal sweeping are again found, namely a laser source LA for producing coherent-excitation light along an input axis A3 and a sample to be analyzed disposed beneath the objective J1 of a microscope MC1.

It should be observed that in FIG. 9, the sample EA is disposed for example along the axis A3 described with reference to FIG. 6.

Under these conditions, the transmitted portion TFE of the coherent-excitation beam FE illuminates the sample EA to be analyzed.

It is to be recalled here that it is the splitter member LS1 which splits the excitation beam FE into a reflected portion RFE (not shown) and a transmitted portion TFE which will illuminate the sample EA to be analyzed.

The incoherent-scattering beam FD which results from the illumination of the sample is then collected by a lens CA in order to be conveyed onto the splitter member LS1, which for its part will split the scattering beam FD into a transmitted portion TFD (not shown) and a reflected portion RFD. The reflected portion RFD is then filtered by the diaphragm D2 placed on the output axis A0.

It is the displacement of the objective J1 in depth or another intermediate optical element which will here constitute a deflection X1, the objective J1 then constituting the first deflector stage DF1.

The displacement of the objective J1 in depth (here in FIG. 8, along the axis M3) is controlled by a motor MO or by a piezoelectric displacement whose operation is controlled by a control member UC.

According to the invention, there is provided a filter FAA of the excitation beam FE, which filter is disposed for example along an axis parallel to A0 and capable of eliminating a spectral band of predetermined spectral width centered on the frequency corresponding to the electromagnetic radiation wavelength of the laser source LA.

The excitation beam FE is for example conveyed onto the filter FAA via a splitting plate LSS advantageously disposed downstream of the means forming a diaphragm D1.

The filter FAA therefore makes it possible to filter the excitation beam FE and to extract from this excitation beam the main excitation line.

The light flux FED deprived of this excitation line is then conveyed toward a capture means AA through a diaphragm D3.

For example, the filter FAA is of the type described in French Patent Application No. 91 12061 filed by the Inventor on Oct. 1st 1991.

Finally, the capture means AA are connected to the control unit UC which will act on the displacement of the objective J1 in order to search for the spectral signal maximum in the light flux thus detected.

This constitutes a significant advantage, because the automatic control of the displacement of the objective J1, searching for the spectral signal maximum makes it possible automatically to control the focusing on the sample zone to be analyzed characterized by said spectral signal.

In general, the automatic control of the displacement of the objective J1, searching for the spectral signal maximum, may be performed either at the frequency of the excitational radiation, that is to say of the laser, or at frequencies different from the excitational frequency each corresponding to a line or band of the Raman spectrum characteristic of a chosen chemical species, or alternatively for the whole of the Raman spectrum by virtue of a filter eliminating the excitational laser radiation (here with the filter FAA).

As represented in FIG. 9, the deflection X1 in depth allows discrimination called "optical sectioning" by a person skilled in the art by accurately controlling the depth of the analyzed "slice" with respect to the surface or any other reference element.

This deflection X1 in depth may be produced by displacement of the sample, of the objective, or of an intermediate optical element.

The person skilled in the art will understand that it is possible to produce several uses of the deflections X1 and X2.

In a first embodiment example, the first deflection X1 is variable while the deflection X2 is fixed. This configuration corresponds to continuous or step-by-step sweeping of a line (straight or of any shape) over a surface of the sample. The point P1 observed remains conjugate both with the excitation source LA and the diaphragm MD2.

The spectrum dispersed in the spectrometer then occupies a fixed position on the multichannel detection module (a row of pixels).

Such a configuration imparts the advantage of preventing degradation of the sample by laser radiation and also makes it possible to integrate the variations in spectral intensity for a heterogeneous sample.

In another embodiment example, the deflections X1 and X2 are more advantageously made synchronous and variable.

It is to be noted that the synchronism between the deflections X1 and X2 is indispensable in order to keep stigmatism between the sample and the detection module.

Thus, with the deflections synchronous with respect to each other, the successive spectra of the various zones of the sample scanned under the deflection X1 occupy different positions on the pixels of the multichannel detection module, these various positions being variable according to deflection X2.

Such a configuration improves the detection dynamics by virtue of different integration times for successive spectra. It may also allow reconstruction of monochromatic images by digital processing of the signals.

The processing of the signal after reading of the detector elements advantageously makes it possible to take the sum of several lines (binning) or any chosen mathematical operation.

The choice of the deflection X2 coupled to the deflection X1 makes it possible to position the Raman spectra of the various optical sections on different lines of the multichannel detector.

A mapping of the sample to be analyzed is thus obtained.

Inside each optical section, the choice of the deflection X1 makes it possible either to scan a line, or to scan a chosen surface in the sample.

This analysis may clearly also be coupled with the search for the aforementioned maximum intensity or for a value deduced from a reference intensity.

The Inventor has surprisingly also noticed that changing the amplitude of the deflections X1 and X2 makes it possible to produce a variation in magnification of the sample on the multichannel detector.

In other words, the automatic control of the amplitudes of the deflections X1 and X2 makes it possible to adapt, according to the application, the magnification of the sample on the detection module, that is to say to change the number of pixels activated per micron of sample, and to do this independently of the intrinsic spatial resolution given by the device for focusing onto the sample.

In summary, the apparatus according to the invention provides detection modules with analysis elements of higher quality than in the prior art, which, in connection with appropriate processing means, makes it possible to improve the spectrometric analysis of chemical components.

We claim:
1. A spectrometry apparatus comprising:
a coherent-excitation source;
at least one sample holder;
a spectrometer with an input aperture;
a splitter;
a coherent-excitation beam originating from said coherent-excitation source coupled to said splitter by a first optical coupling member;
at least one split coherent-excitation beam originating from said splitter, said at least one split coherent-excitation beam being coupled by a second optical member to a sample held by said at least one sample holder;
an incoherent-scattering beam originating from said sample, said incoherent-scattering beam being coupled by said second optical member to said splitter;

a first transmitted incoherent-scattering beam originating from the coupling of said incoherent-scattering beam and said splitter; said first transmitted incoherent-scattering beam being coupled by a third optical member to the input aperture of said spectrometer;

a first spacial filtering means located in the path of the coherent-excitation beam;

a second spacial filtering means located along the path of said incoherent-scattering beam and said first transmitted incoherent-scattering beam;

a first deflector means disposed between said splitter and said at least one sample holder wherein said at least one split coherent-excitation beam and said incoherent-scattering beam pass through said first deflector; and said first deflector means causes said at least one split coherent-excitation beam to illuminate a predetermined point on said sample, wherein said point oscillates along a predetermined line over said sample.

2. The spectrometry apparatus of claim 1 wherein said first spacial filtering means consists of a first lens and a first diaphragm with a first aperture, and said second spacial filtering means consists of a second lens and a second diaphragm with a second aperture.

3. The spectrometry apparatus of claim 2 wherein said first and second apertures correspond in shape which may be rectangular or circular.

4. The spectrometry apparatus of claim 2 wherein said first and second apertures are adjustable.

5. The spectrometry apparatus of claim 1 further comprising:

a second deflector means disposed between said splitter and said spectrometer along the pathway of said first transmitted incoherent-scattering beam;

said second deflector controlling the direction of said first transmitted incoherent-scattering beam over a line centered across said input aperture of said spectrometer such that said first transmitted incoherent-scattering beam oscillates across said input aperture; and said oscillation of said first transmitted incoherent-scattering beam being synchronized with said oscillatory motion of said at least one coherent-excitation beam controlled by said first deflector.

6. The spectrometry apparatus of claim 5, further including:

an electronic control unit (UC), operatively connected to said first and second deflector means (DF1 and DF2);

said first and said second deflector means control the oscillation of the first transmitted incoherent and the at least one coherent-excitation beam in response to predetermined criteria originated in said electronic control unit thereby allowing the creation of a predetermined ratio between amplitudes of the beam oscillations enabling selected magnification on the multichannel detection module of the sample held by said sample holder.

7. The spectrometry apparatus of claim 1, wherein the spectrometer further includes:

a multi-channel detection module with a plurality of detector elements; and, a processing means for analyzing the signals picked up by said detector elements.

8. The spectrometry apparatus of claim 1, further including:

a second splitter located in the pathway of said coherent-excitation beam;

a capture means;

a split beam originating from the coupling of said incoherent-scattering beam and said second splitter, and coupled to said capture means;

a spectral filtering means placed in the path of said split beam between said second splitter and said capture means, said spectral filtering means having a predetermined band width to eliminate a predetermined spectral band from said split beam;

said capture means measuring the light flux of said split beam; and, a third spatial filter, placed in the path of said split beam between said second splitter and said capture means, consisting of a diaphragm with an aperture to spatially filter said split feedback beam.

9. A spectrometry apparatus comprising:

a coherent-excitation source;

at least one sample holder;

a spectrometer with an input aperture;

a splitter;

a coherent-excitation beam originating from said coherent-excitation source and coupled to said splitter by a first optical coupling member;

at least one split coherent-excitation beam originating from said splitter, said at least one split coherent-excitation beam being coupled by a second optical member to a sample held by said at least one sample holder;

an incoherent-scattering beam originating from said sample, said incoherent-scattering beam being coupled by said second optical member to said splitter;

a transmitted incoherent-scattering beam originating from the coupling of said incoherent-scattering beam and said splitter said transmitted incoherent-scattering beams being coupled by a third optical member to the input aperture of said spectrometer;

a first spacial filtering means located in the path of the coherent-excitation beam;

a second spacial filtering means located along the path of said incoherent-scattering beam and said transmitted incoherent-scattering beam;

a first deflector means disposed between said splitter and said at least one sample holder wherein said at least one split coherent-excitation beam and said incoherent-scattering beam pass through said first deflector;

said first deflector means causes said at least one split coherent-excitation beam to illuminate a predetermined point on said sample, wherein said point oscillates along a predetermined line over said sample;

wherein said spectrometer includes a multi-channel detection module with a plurality of detector elements and a processing means for analyzing the signals picked up by said detector elements;

a second deflector means disposed between said splitter and said spectrometer along the pathway of said transmitted incoherent-scattering beam;

said second deflector controlling the direction of said transmitted incoherent-scattering beam over a line centered across said input aperture of said spectrometer such that said transmitted incoherent-scattering beam oscillates across said input aperture;

said oscillation of said transmitted incoherent-scattering beam being synchronized with said oscillatory motion of said at least one coherent-excitation beam controlled by said first deflector;

a second splitter located in the pathway of said incoherent-scattering beam;

a capture means;

a split beam originating from the coupling of said incoherent-scattering beam and said second splitter, and coupled to said capture means;

a spectral filtering means placed in the path of said split beam between said second splitter and said capture means, having a predetermined band width to eliminate a predetermined spectral band from said split beam;

said capture means measuring the light flux of said split beam; and, a third spatial filter, placed in the path of said split beam between said second splitter and said capture means, consisting of a diaphragm with an aperture to spatially filter said split beam.

* * * * *